United States Patent
Prud'Homme-Lacroix

(10) Patent No.: US 9,085,361 B2
(45) Date of Patent: Jul. 21, 2015

(54) LANDING GEAR PROVIDED WITH A STIFFENER FOR INCREASING ITS STIFFNESS IN ROLL, AND AN AIRCRAFT

(71) Applicant: EUROCOPTER, Marignane, Cedex (FR)

(72) Inventor: Pierre Prud'Homme-Lacroix, Vitrolles (FR)

(73) Assignee: Airbus Helicopters, Marignane Cedex (FR)

( * ) Notice: Subject to any disclaimer, the term of this patent is extended or adjusted under 35 U.S.C. 154(b) by 59 days.

(21) Appl. No.: 14/033,630

(22) Filed: Sep. 23, 2013

(65) Prior Publication Data

US 2014/0084109 A1 Mar. 27, 2014

(30) Foreign Application Priority Data

Sep. 27, 2012 (FR) ...................... 12 02567

(51) Int. Cl.
*B64C 25/52* (2006.01)
*B64C 25/58* (2006.01)
*B64C 25/32* (2006.01)

(52) U.S. Cl.
CPC ............... *B64C 25/52* (2013.01); *B64C 25/58* (2013.01); *B64C 2025/325* (2013.01)

(58) Field of Classification Search
CPC ........ B64C 25/52; B64C 25/58; B64C 25/62; B64C 25/64; B64C 25/06; B64C 2025/325
USPC .............................................. 244/17.17, 108
See application file for complete search history.

(56) References Cited

U.S. PATENT DOCUMENTS

| 1,345,833 | A | * | 7/1920 | Caproni | 244/104 R |
| 2,479,976 | A | * | 8/1949 | Shultz | 244/104 LS |
| 3,173,632 | A | | 3/1965 | Woods | |
| 4,270,711 | A | | 6/1981 | Cresap | |
| 4,519,559 | A | | 5/1985 | Logan | |
| 4,645,143 | A | | 2/1987 | Coffy | |
| 6,244,538 | B1 | | 6/2001 | Howard | |

FOREIGN PATENT DOCUMENTS

FR 2554210 A1 5/1985

OTHER PUBLICATIONS

Search Report and Written Opinion; Application No. FR 1202567; dated Jun. 6, 2013.

* cited by examiner

*Primary Examiner* — Tien Dinh
*Assistant Examiner* — Richard R Green
(74) *Attorney, Agent, or Firm* — Brooks Kushman P.C.

(57) ABSTRACT

Aircraft landing gear (5) having a first skid (6) and a second skid (7), together with two cross-members, each having a first branch (16) secured to the first skid (6) and a second branch (17) secured to the second skid (7), and a central portion (13) secured to the downward first branch (16) and to the second branch (17). The landing gear (5) has at least one stiffener (20) with at least one connecting rod (30) and at least one limiter means (40) for limiting roll deformation of the central portion (13) of a cross-member, each limiter means (40) being secured to said central portion (13) of the cross-member, at least one main hinge (33) hinging each connecting rod to said limiter means and a secondary hinge (34) connecting each connecting rod to an outside point that is outside the central portion (13) in order to limit the deformation of the central portion (13) as a result of a roll movement of an aircraft (1).

19 Claims, 3 Drawing Sheets

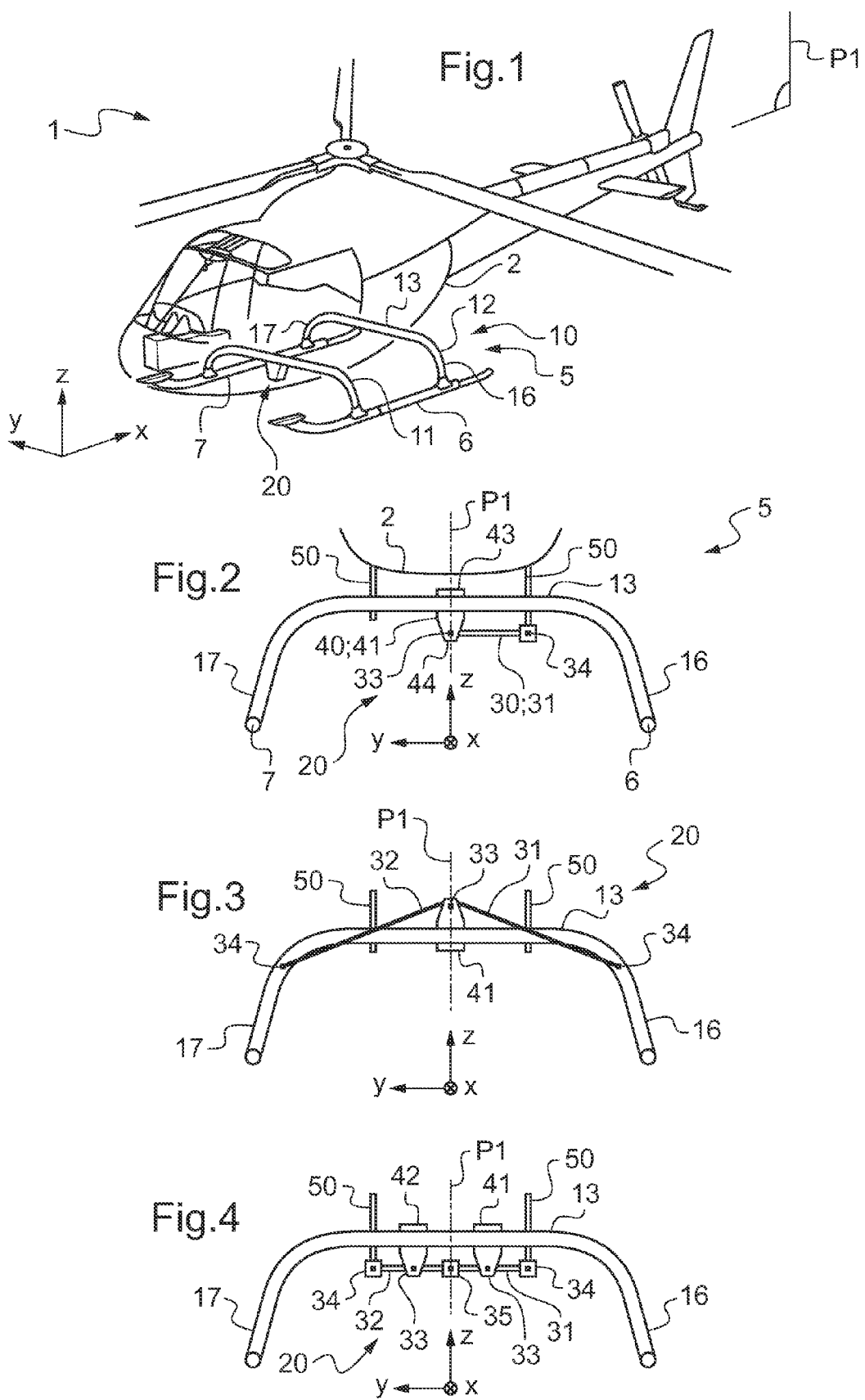

US 9,085,361 B2

LANDING GEAR PROVIDED WITH A STIFFENER FOR INCREASING ITS STIFFNESS IN ROLL, AND AN AIRCRAFT

CROSS REFERENCE TO RELATED APPLICATIONS

This application claims priority to French patent application No. FR 12 02567 filed on Sep. 27, 2012, the disclosure of which is incorporated in its entirety by reference herein.

BACKGROUND OF THE INVENTION (1) Field of the Invention

The present invention relates to landing gear provided with a stiffener in order to increase its stiffness in roll, and to an aircraft having such landing gear. More precisely, the invention lies in the technical field of skid landing gear.

(2) Description of Related Art

Conventionally, a rotorcraft has landing gear on which the aircraft stands when on the ground. More particularly, landing gear includes so-called "skid" landing gear provided with first and second longitudinal bearing skids. The skids are for coming into contact with the ground and they are arranged on either side of the fuselage of the rotorcraft. The first longitudinal bearing skid and the second longitudinal bearing skid together define a plane referred for convenience as the "bearing" plane.

The aircraft then stands on the ground via two elongate skids.

Furthermore, skid landing gear is usually provided with a first cross-member and with a second cross-member, each connecting the first skid to the second skid and serving to connect each of the skids to the fuselage of the aircraft.

The first cross-member is referred to as a "front" cross-member since the first cross-member connects the fuselage to zones situated near the front ends of the first and second longitudinal skids. Conversely, the second cross-member is said to be a "rear" cross-member insofar as the second cross-member connects the fuselage to zones situated near the rear ends of the first and second longitudinal skids.

The landing gear is thus fastened to the aircraft via the front and rear cross-members.

Such landing gear is very effective and enables a rotorcraft to land on numerous types of surface.

A rotorcraft that has at least three hinged blades may be subjected in particular to a phenomenon of ground resonance.

The oscillations of each blade about its lead/lag axis can become coupled in unstable manner with movements of the fuselage of the rotorcraft depending on the elastic deformation modes of the landing gear: this is at the origin of the so-called "ground resonance" phenomenon.

As they rotate, the blades move away from their equilibrium positions and can thus become distributed non-uniformly. This non-uniform distribution gives rise to unbalance by moving the center of gravity of the rotors away from the axis of rotation of the rotor. Furthermore, blades that are offset from their equilibrium positions oscillate about those equilibrium positions at an oscillation frequency $\omega_\delta$, which is the resonant frequency of the blades in lag.

If $\Omega$ is the frequency of rotation of the rotor, the fuselage of the rotorcraft is thus excited at two frequencies $|\Omega \pm \omega_\delta|$.

When standing on the ground on the landing gear, the rotorcraft fuselage may be thought of as a mass system that is supported above the ground by a spring and a damper constituted by the downward branches of the cross-members. The fuselage supported in this way on the landing gear is thus characterized by resonant modes of vibration in roll and in pitching. There is a danger of instability on the ground when the resonant frequency of the fuselage in roll or in pitching comes close to the resonant frequency of oscillation $|\pm\omega_\delta|$ or $|\Omega-\omega_\delta|$, and this corresponds to the ground resonance phenomenon.

In order to avoid such instability, it is known in particular to seek to avoid those frequencies crossing by adapting the stiffness of the landing gear in roll and/or pitching.

Nevertheless, it can be complex to adapt landing gear. A compromise needs to be found in particular between firstly the vertical stiffness of the landing gear, which determines comfort and also the loading imparted to the structure during a landing, and secondly the stiffnesses in pitching and in roll that have a large influence on the ground resonance behavior.

It is recalled that the person skilled in the art uses the term "vertical stiffness" to designate the stiffness of the landing gear under the effect of gravity along the elevation axis of the aircraft, and ignoring its static trim.

Developing skid landing gear is thus a process that is generally lengthy and difficult. This development is therefore rarely reviewed during the lifetime of an aircraft.

However, substantial modifications may be made to an aircraft during its lifetime. The resonant frequencies of the fuselage in roll and/or in pitching can therefore change, and thus run the risk of causing the ground resonance phenomenon to appear.

Under such circumstances, a manufacturer may attempt to modify the stiffnesses of the landing gear in roll and in pitching, without having too much influence on the behavior of the aircraft, in particular when landing.

For this purpose, shape modifications may be applied to skid landing gear. Nevertheless, such shape modifications can present the drawback of modifying the vertical stiffness of the landing gear. In particular, this can have an impact on the behavior of the landing gear.

Certification tests may then be required in order to demonstrate that the modified landing gear still complies with the certification regulations that are in force.

It should not be forgotten that developing skid landing gear is a process that can be lengthy and expensive.

An object of the present invention is thus to propose landing gear fitted with a stiffener, and also to propose an aircraft including such landing gear.

In this context, the technological background includes document FR 2 554 210 which describes a flexible beam made of composite materials and substantially in the form of an elongate box of laminated structure. Two rigid sole plates are connected together by two webs.

An energy-absorbing deformable stud is placed between the two sole plates and includes at least one block of elastomer material having a high level of remanence in deformation.

The beam also includes at least one viscoelastic damper mounted on the outside face of the sole plate. The damper is stressed in traction by the bending deformation of the beam so as to produce damping that is added to the damping provided by each energy absorber stud.

Such a beam may be used on skid landing gear.

That configuration suggests using an elastomer within a cross-member and within a damper fastened under the cross-member. That configuration is remote from the invention and it has little influence on the location of the resonant frequencies of the fuselage in roll or in pitching relative to the resonant frequencies of oscillation $|\Omega\pm\omega_\delta|$ or $|\Omega-\omega_\delta|$.

Document U.S. Pat. No. 4,270,711 describes landing gear provided with a beam that is connected by a pivot to a cross-member of the landing gear so as to be capable of pivoting about a pivot axis. The ends of the beam are then fastened to the structure of the aircraft.

That teaching makes it possible in particular to fasten landing gear having at least three fastener points to a structure that has four fastener points.

Document U.S. Pat. No. 6,244,538 describes landing gear.

That document makes it possible to locate the resonant frequencies of the fuselage in roll or in pitching relative to the resonant frequencies of oscillation $|\Omega\pm\omega_\delta|$ or $|\Omega-\omega_\delta|$ as a function of the flare point of support connecting rods.

Document U.S. Pat. No. 3,173,632 describes landing gear having two skids connected by two torsion rods. Each torsion rod is secured to two arms, with each arm being hinged to an upright extending upwards from a skid.

Movement prevention means are also provided for authorizing or preventing each torsion rod to move in pivoting about its axis of symmetry.

Also known is Document U.S. Pat. No. 4,519,559.

BRIEF SUMMARY OF THE INVENTION

The invention thus seeks to provide landing gear provided with a stiffener for increasing its stiffness in roll, while generating little or no modification to the vertical stiffness of the landing gear.

The invention provides aircraft landing gear having a first longitudinal bearing skid named "first skid" and a second longitudinal bearing skid named "second skid", together with a front cross-member and a rear cross-member each interconnecting the first and second skids. Each cross-member then has a first downward branch secured to the first skid and a second downward branch secured to the second skid, and a central portion secured to the first and second downward branches.

The landing gear includes at least one stiffener arranged on a cross-member, the stiffener having at least one connecting rod and at least one limiter means for limiting roll deformation of the central portion.

The limiter means are then secured to the central portion of the cross-member. Furthermore, the stiffener comprising at least one main hinge for hinging each connecting rod of the limiter means and one secondary hinge per connecting rod for hinging each connecting rod to an outside point that is outside the central portion in order to limit the deformation of the central portion as a result of a roll movement of the aircraft.

The term "hinge" is used to designate any means or device enabling the connecting rod to move relative to the member to which it is hinged.

Thus, a hinge may possibly comprise no more than an orifice and a pivot pin. A main hinge may then comprise for example an orifice formed in a connecting rod, the orifice having a pin passing therethrough that is connected to the limiter means.

Surprisingly, such a stiffener makes it possible to increase the roll stiffness of the landing gear while having little or no impact on the vertical stiffness of the landing gear.

Furthermore, it can be understood that the invention may be performed merely by fitting such a stiffener to already-existing landing gear, e.g. in order to adapt the landing gear to a new configuration of a rotorcraft. After an increase in the weight of an aircraft or after a change in the lift rotor of an aircraft, it may be appropriate to make use of a stiffener of the invention.

The central portion of the cross-member deforms differently depending on the way in which it is stressed.

The cross-member is stressed vertically in a first bending mode while landing, and it is stressed in a second bending mode, in roll, e.g. when stressed in the roll direction by the ground.

Thus, the central portion presents a C-shape in the first bending mode, which is vertical. The deformation of the central portion thus presents an antinode.

Each connecting rod of a stiffener then allows the corresponding limiter means to move together with the central portion. The impact of the stiffener on the vertical stiffness on the landing gear is therefore limited.

In contrast, the central portion of a cross-member tends to present an S-shape during the second bending mode, in roll. The deformation of the central portion then presents two antinodes joined together at a node.

Each connecting rod of a stiffener then tends to prevent movement of the associated limiter means.

The limiter means thus tend to limit the deformation of the central portion. The roll stiffness of the landing gear is therefore increased.

Consequently, the invention presents a stiffener that takes account of the way a cross-member deforms, and more particularly the way its central portion that is connected to the structure of an aircraft deforms, in order to act mainly on the stiffness in roll of the landing gear.

The landing gear may also include one or more of the following additional characteristics.

For example, it is possible for a stiffener to be fitted to only the front cross-member.

Nevertheless, it is entirely possible to envisage fitting a stiffener to both of the cross-members of landing gear.

Furthermore, each limiter means may comprise a gusset having firstly a base secured to a central portion, and secondly a distal end hinged to at least one connecting rod by a main hinge.

In a first embodiment, the stiffener of a cross-member comprises a single gusset, the gusset having a base extending along a central portion on either side of a plane of symmetry of said central portion.

The movement of the gusset is then at a maximum in the vertical, first bending mode that occurs during a landing.

In contrast, the gusset tends to perform a pivoting movement only during the second bending mode, in roll. A relatively simple device thus serves to hold the gusset still by eliminating such pivoting.

In a first variant of this first embodiment, the stiffener then has a single connecting rod extending from a first end hinged to a gusset by a main hinge, to a second end co-operating with a secondary hinge.

The second hinge may then be hinged to the fuselage of an aircraft standing on the landing gear.

In another alternative, the stiffener has a flange for fastening the central portion to a structure of an aircraft, said secondary hinge hinging said connecting rod to said fastener flange.

In the second bending mode, in roll, the outside point to which the connecting rod is hinged tends to remain stationary relative to the landing gear. Pivoting of the gusset during the second bending mode in roll thus tends to be blocked by the connecting rod of the stiffener. The gusset thus limits deformation of the central portion.

In a second variant of this first embodiment, said stiffener has a first connecting rod that is hinged firstly to said gusset and secondly to the first downward branch of a cross-member, said stiffener having a second connecting rod that is hinged firstly to said gusset and secondly to the second downward branch of the cross-member.

A manufacturer can identify a "main" point on the gusset that is hinged to two connecting rods via a main hinge, and two "secondary" points that are respectively on first and second downward branches and that are hinged to the two connecting rods via two secondary hinges and that satisfy the following two criteria:

the main point remains at equal distances from the two secondary points in the vertical, first bending mode; and the two secondary points tend to be subjected to a large amount of relative movement in the second bending mode, in roll.

In a second embodiment, stiffener of a central portion comprises:

two gussets disposed on either side of a plane of symmetry of said central portion; and two connecting rods, each extending from a first end to a second end that co-operates with a secondary hinge, each connecting rod being hinged to a respective gusset by a main hinge, between its first end and its second end, said first ends of said two connecting rods being hinged to each other by a tertiary hinge, each secondary hinge being hinged to an outside point that is outside said central portion.

Each secondary hinge may then be hinged to the fuselage of an aircraft standing on the landing gear.

In another variant of the second embodiment, said stiffener has two fastener flanges for fastening the central portion to a structure of an aircraft, with each secondary hinge being hinged to a respective fastener flange.

Independently of the variant, the two gussets are optionally symmetrical about said plane of symmetry, said two connecting rods being symmetrical about the plane of symmetry.

In addition to landing gear, the invention also provides an aircraft. The aircraft includes landing gear of the invention as described above.

BRIEF DESCRIPTION OF THE SEVERAL VIEWS OF THE DRAWINGS

The invention and its advantages appear in greater detail from the following description of embodiments given by way of illustration with reference to the accompanying figures, in which:

FIG. 1 shows an aircraft of the invention;

FIG. 2 is a diagram showing a first variant of a first embodiment;

FIG. 3 is a diagram showing a second variant of a first embodiment;

FIG. 4 is a diagram showing a second embodiment;

Figure 5:
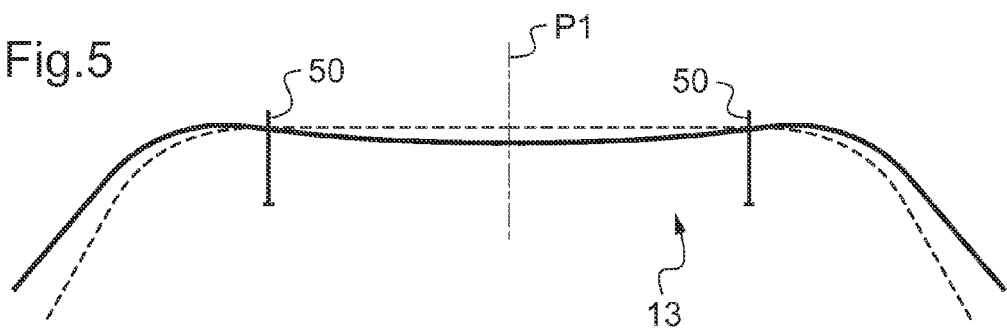
FIG. 5 is a diagram showing the deformation of the cross-member in the first bending mode, which is vertical in the second bending mode, in roll.

Elements that are present in more than one of the figures are given the same references in each of them.

DETAILED DESCRIPTION OF THE INVENTION

Three mutually orthogonal directions X, Y, and Z are shown in some of the figures.

The first direction X is said to be longitudinal. The term "longitudinal" relates to any direction parallel to the first direction X.

The second direction is said to be transverse. The term "transverse" relates to any direction parallel to the second direction Y.

Finally, the third direction Z is said to be in elevation. The terms "in elevation" or "vertical" relate to any direction parallel to the third direction Z.

FIG. 1 shows an aircraft, and more particularly a rotorcraft.

The aircraft 1 has a fuselage 2 that extends longitudinally along an anteroposterior plane of symmetry P1. The fuselage is also secured to skid landing gear 5.

It should be observed that a portion of the fuselage 2 is drawn as being transparent in order to show the landing gear 5.

The landing gear 5 has a first longitudinal bearing skid 6 named "first skid" and a second longitudinal bearing skid 7 named "second skid".

Under such circumstances, the landing gear comprises two cross-members 10 connecting together the first and second skids 6 and 7, i.e. a front cross-member 11 and a rear cross-member 12.

Each cross-member 10 is provided with a first branch 16 that is secured to the first skid 6, a second branch 17 that is secured to the second skid 7, and a central portion 13 that is secured to the first branch 16 and to the second branch 17. The branches are sometimes said to be downward branches insofar as they extend from the central portion towards the skid by coming closer to the ground. Thus, each central portion 13 is contained substantially in a horizontal plane, with the downward branches 16 and 17 extending from the horizontal plane towards the skids 6 and 7. Each central portion may comprise a rectilinear tube or a tube that possesses a small amount of curvature.

The landing gear 5 is then connected to the fuselage 2 by fastener means, such as fastener flanges.

In the invention, the landing gear 5 is provided with at least one stiffener 20 co-operating with a cross-member 10. The stiffener 20 is merely shown diagrammatically on the front cross-member in FIG. 1 in order to avoid overloading the figure.

It is possible for each of the cross-members to be provided with such a stiffener.

FIGS. 2 to 4 show two embodiments of a stiffener.

Independently of the embodiment and with reference to FIG. 1, each stiffener 20 of the invention comprises at least one connecting rod 30 co-operating with limiter means 40 secured to the central portion of the cross-member. Each connecting rod may extend transversely.

Each connecting rod 30 then has the function of impeding movement of the limiter means during the second bending mode, in roll, while having limited impact on the first bending mode, which is vertical.

Under such circumstances, the limiter means tend to limit deformation of the central portion during the second bending mode, in roll. The stiffener thus serves to increase the roll stiffness of the landing gear, while having a limited impact on the vertical stiffness of the same landing gear.

It is explained below that these objectives can be satisfied with the help of a device that is relatively simple. The deformation of the central portion takes on shapes that are different depending on the bending mode that is being engaged.

In FIG. 5, there can be seen a cross-member in flight drawn as a dashed line, and a cross-member during landing, drawn as a continuous line.

During a landing, the cross-member is stressed in the first bending mode, which is vertical. The central portion thus tends to take on a C-shape.

Figure 6:
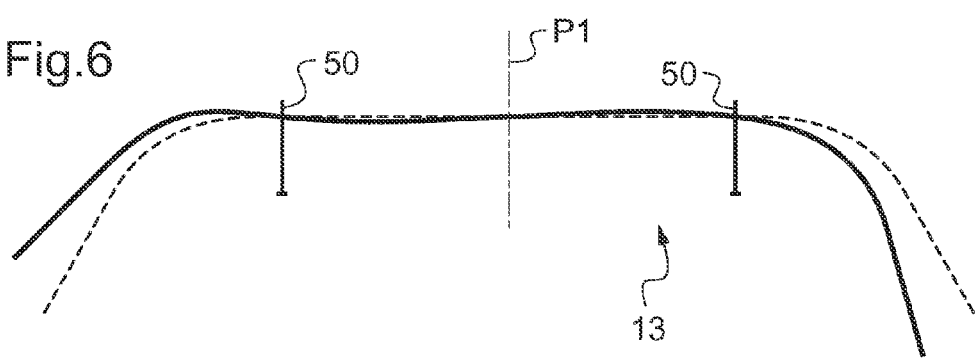
FIG. 6 is a diagram showing the deformation of a cross-member in the second mode of roll bending.

FIG. 6 again shows a cross-member in flight as a dashed line, but in contrast its continuous line shows a cross-member while on the ground with the rotor rotating, the cross-member being stressed in a second bending mode, in roll.

In this mode of deformation, the central portion then tends to have an S-shape, presenting two loads on either side of the plane of symmetry P1.

The invention thus takes these different profiles of deformation into consideration in order to act on the roll stiffness of the landing gear, so as to have limited impact on vertical stiffness.

Under such circumstances, and with reference to FIG. 2, the limiter means may comprise a gusset extending in elevation from a base 43 to a distal end 44. The base 43 is fastened to the central portion while the distal end lies in a plane lying above or below the central portion.

Furthermore, each connecting rod is hinged to the limiter means via a main hinge 33, such as a main hinge 33 co-operating with the distal end 44 of a gusset.

Each connecting rod is also hinged to a point outside the central portion of a cross-member by a secondary hinge 34. This outside point is an anchor point that does not belong to the central portion of a cross-member, i.e. a point on a member that is distinct from the central portion.

In a first embodiment as shown in FIGS. 2 and 3, a stiffener comprises a single gusset 41.

The gusset 41 is arranged in the middle of the central portion. Consequently, the base 43 of the gusset 41 extends on either side of the plane of symmetry P1. However, the main hinge 33 of each connecting rod lies substantially in the plane of symmetry P1.

In a first variant of the first embodiment as shown diagrammatically in FIG. 2, the stiffener possesses a single connecting rod 31. This single connecting rod 31 then extends from a first end co-operating with a main hinge 33 to a second end co-operating with a secondary hinge 34.

The secondary hinge 34 is thus hinged to an outside point such as a member of the fuselage 2, or indeed a flange 50 for fastening the cross-member to the fuselage 2 in the example shown.

Figure 7:
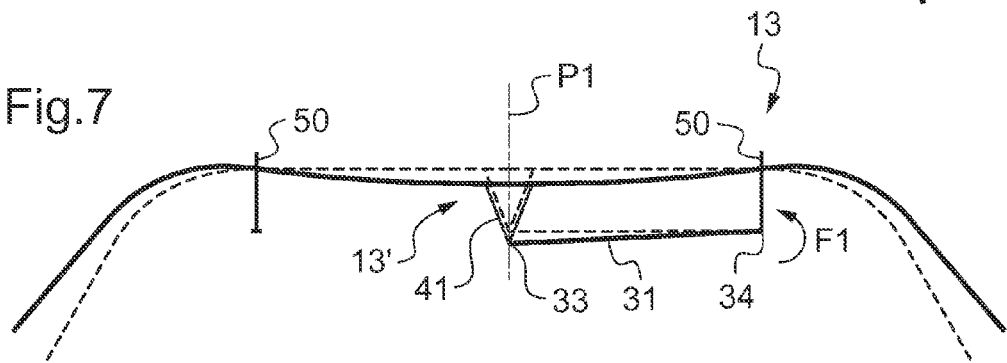
FIGS. 7 and 8 are diagrams explaining the operation of the first variant of a first embodiment.
Figure 8:
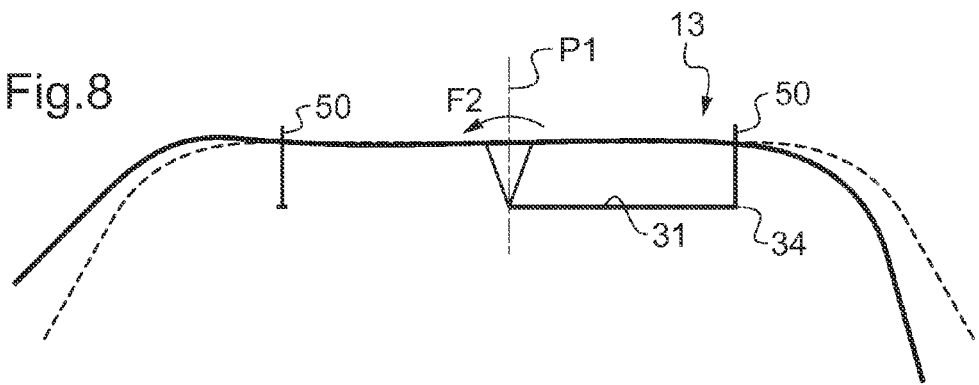

FIGS. 7 and 8 explain the operation of the first variant of the first embodiment by showing a cross-member in flight using a dashed line and showing the deformation of a cross-member using a continuous line.

With reference to FIG. 7, and during a landing, the central portion tends to deform so as to have a C-shape.

The central segment 13' of the central portion 13 carrying the gusset 41 moves closer to the ground. The gusset 41 then tends to move together with the central segment.

The connecting rod 31 has limited impact on this movement. The connecting rod 31 then pivots about its secondary hinge 34 along arrow F1. It can be understood that the gusset may in turn pivot a little under the influence of the main hinge 33.

It should be observed that the flange 50 may include transverse blocking means so as to enable it to take up lateral forces. In particular, it is possible to use a clip fastened to the central portion 13.

The invention may make it possible to avoid using such transverse blocking means. In this variant, the gusset serves to take up lateral forces, thus making it possible to eliminate lateral abutments between the cross-member and the fuselage. Under such circumstances, the gusset can remain substantially vertical, instead of pivoting a little.

The stiffener thus modifies the vertical stiffness of the landing gear little or not at all and therefore modifies the behavior of the landing gear during landing and takeoff little or not at all.

In contrast, the stiffness has non-negligible impact on the stiffness of the landing gear, in roll.

With reference to FIG. 8, and in the second bending mode, in roll on the ground, the central portion tends to deform so as to have an S-shape presenting two antinodes and one node.

Such deformation tends to cause the gusset 41 to pivot as shown by arrow F2 at the node. However, the outside point to which the secondary hinge 34 is attached remains stationary. The connecting rod 31 then tends to prevent the pivoting movement of the gusset 41, and possibly to prevent the central portion 13 from deforming.

The roll stiffness of the landing gear is thus increased.

In a second variant of the first embodiment as shown diagrammatically in FIG. 3, the stiffener has two connecting rods 31 and 32.

This stiffener 20 thus has a first connecting rod 31 that is hinged to the gusset 41 by a main hinge, and to the first branch 16 by a second hinge. Likewise, the stiffener 20 has a second connecting rod 32 that is hinged by a main hinge to the gusset 41 and to the second branch 17 by a secondary hinge.

Each connecting rod can thus be secured to pivot that co-operate with orifices in the gussets and in the downward branches.

The manufacturer selects hinge points for the connecting rods that remain at a constant distance during landing, but that are subjected to large amounts of relative movement during the second mode of bending, in roll.

Figure 9:
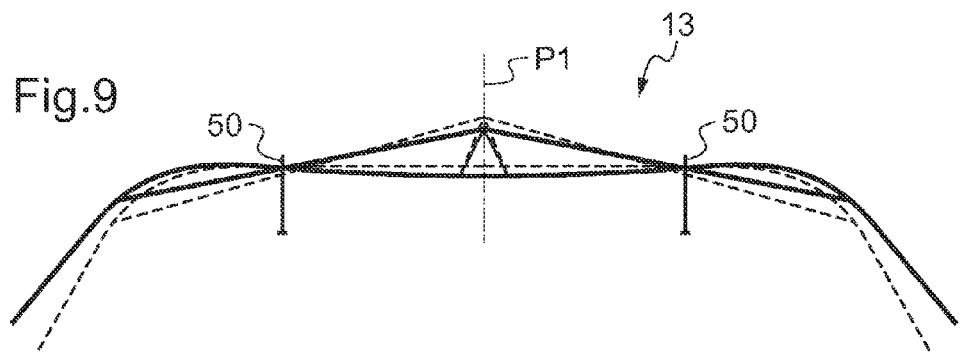
FIGS. 9 and 10 are diagrams explaining the operation of a second variant of a first embodiment.
Figure 10:
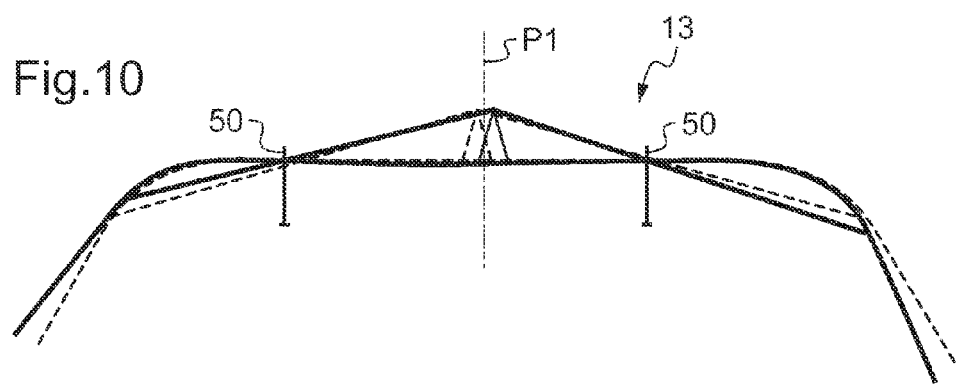

FIGS. 9 and 10 explain the operation of the second variant of the first embodiment, showing a cross-member in flight with dashed lines and showing a deformed cross-member with continuous lines.

With reference to FIG. 9 and during a landing, the connecting rods pivot relative to the gusset and to the downward branches of the cross-member.

Under such circumstances, the distances between the distal end of the gusset and the secondary hinges of the connecting rods remain substantially constant.

The connecting rods then have limited impact on the gusset and on the behavior of the central portion.

With reference to FIG. 10, and in the second mode of bending, in roll on the ground, said secondary hinges are subjected to large amounts of movement relative to the gusset. The stiffness then interferes strongly in the deformation of the cross-member.

In a second embodiment shown diagrammatically in FIG. 4, the stiffness possesses two gussets 41, 42 arranged on either side of a plane of symmetry P1 of said central portion 13.

In addition, the stiffener is provided with two connecting rods 31, 32 that are rigid, each extending from a first end that co-operates with a third hinge 35 towards a second end that co-operates with a second hinge 34. Each connecting rod is also hinged to a gusset via a main hinge 33 arranged between its first end and its second end.

By way of example, a main hinge may comprise a pivot secured to a connecting rod between its first end and its second end, the pivot co-operating with the cheeks of a gusset.

Consequently, the two connecting rods are hinged to each other by the tertiary connection 35, each secondary hinge being hinged to an outside point relative to said central portion. Each outside point is an anchor point that does not belong to the central portion of a cross-member, i.e. that belongs to a member that is distinct from the central portion.

Each secondary hinge 34 is then hinged to an outside point such as a member of the fuselage 2, or indeed a flange 50 for fastening the cross-member to the fuselage 2 in the example shown.

In the example shown, the two gussets are arranged symmetrically about the plane of symmetry, with the two connecting rods being symmetrical about said plane of symmetry P1.

Figure 11:
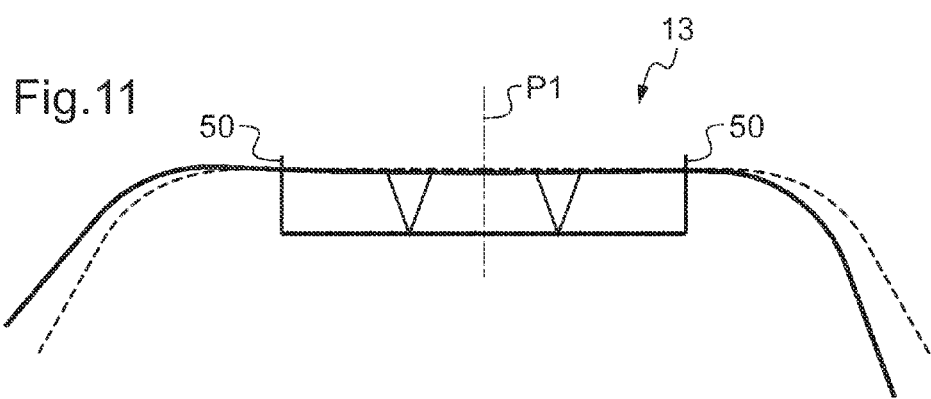
FIGS. 11 and 12 are diagrams explaining the operation of a second embodiment.
Figure 12:
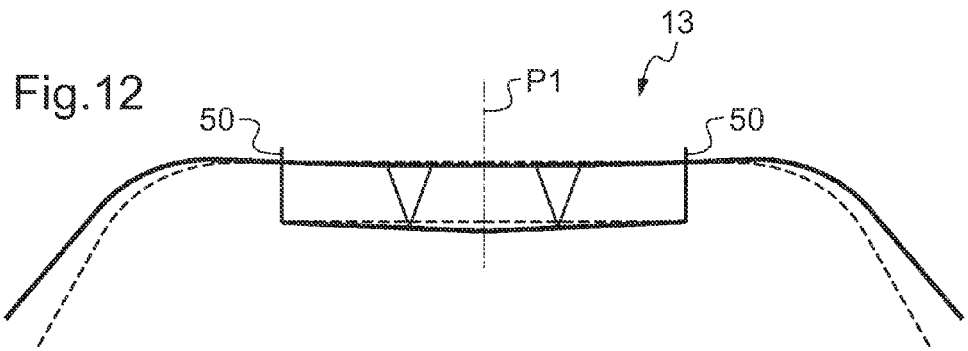

FIGS. 11 and 12 explain the operation of the second embodiment and they show a cross-member in flight as a dashed line and a deformed cross-member as a continuous line.

With reference to FIG. 11, and during a landing, the gussets move together in parallel in a vertical direction. The gussets therefore interfere little or not at all with the movement of the central portion.

In contrast, with reference to FIG. 12, and in the second bending mode, in roll on the ground, the gussets tend to move vertically but in opposite directions. This movement is thus prevented by the connecting rods insofar as the connecting rods are connected together by the tertiary hinge 35.

Naturally, the present invention may be subjected to numerous variants as to its implementation. Although several embodiments are described, it will readily be understood that it is not possible to identify exhaustively all possible embodiments. It is naturally possible to envisage replacing any of the means described by equivalent means without going beyond the ambit of the present invention.

What is claimed is:

1. Aircraft landing gear having a first longitudinal bearing skid and a second longitudinal bearing skid extending in a longitudinal direction, together with a front cross-member and a rear cross-member, each cross-member interconnecting the first and second skids, each cross-member having a first downward branch secured to the first skid and a second downward branch secured to the second skid, and a central portion secured to the first and second downward branches, wherein the landing gear includes a stiffener arranged on the front cross-member or rear cross-member, the stiffener having a connecting rod extending generally in a transverse direction perpendicular to the longitudinal direction and a limiter means for limiting roll deformation of the central portion, the limiter means being secured to the central portion of the respective cross-member, the stiffener comprising a main hinge for hinging the connecting rod to the limiter means and a secondary hinge for hinging the connecting rod to an outside point that is outside the central portion in order to limit the deformation of the central portion as a result of a roll movement of the aircraft.

2. Landing gear according to claim 1, wherein the front cross-member is provided with the stiffener.

3. Landing gear according to claim 1, wherein the limiter means comprises a gusset having firstly a base secured to the central portion, and secondly a distal end hinged to the connecting rod by the main hinge.

4. Landing gear according to claim 1, wherein the stiffener comprises a single gusset, the gusset having a base extending along the central portion on either side of a plane of symmetry (P1) of the central portion.

5. Landing gear according to claim 4, wherein the connecting rod is a single connecting rod extending from a first end hinged to the gusset by the main hinge, to a second end co-operating with the secondary hinge.

6. Landing gear according to claim 4, wherein the stiffener has a flange for fastening the central portion to a structure of the aircraft, the secondary hinge hinging the connecting rod to the fastener flange.

7. Landing gear according to claim 4, wherein the first connecting rod is hinged firstly to the gusset and secondly to the first downward branch, the stiffener further comprising a second connecting rod that is hinged firstly to the gusset and secondly to the second downward branch.

8. Landing gear according to claim 1, wherein the limiter means comprises
    two gussets disposed on either side of a plane of symmetry (P1) of the central portion; and wherein the stiffener further comprises a second connecting rod associated with a second main hinge and a second secondary hinge, the connecting rod and the second connecting rod
    each extending from a first end to a second end that co-operates with the respective secondary hinge, each connecting rod being hinged to the respective gusset by the respective main hinge between its first end and its second end, the first ends of the two connecting rods being hinged to each other by a tertiary hinge, each secondary hinge being hinged to an outside point that is outside the central portion.

9. Landing gear according to claim 8, wherein the stiffener has two fastener flanges for fastening the central portion to a structure of the aircraft, with each secondary hinge being hinged to a respective fastener flange.

10. Landing gear according to claim 8, wherein the two gussets are symmetrical about the plane of symmetry (P1), the connecting rod and the second connecting rod being symmetrical about the plane of symmetry (P1).

11. An aircraft, wherein the aircraft has landing gear according to claim 1.

12. Landing gear for an aircraft, the landing gear comprising:
    a first longitudinal bearing skid and a second longitudinal bearing skid;
    a front cross-member and a rear cross-member, each cross-member interconnecting the first and second skids, each cross-member having a first downward branch secured to the first skid, a second downward branch secured to the second skid, and a central portion secured to the first and second downward branches; and
    a stiffener arranged on the front cross-member or rear cross-member, the stiffener having first and second gussets secured to the central portion and disposed on either side of a plane of symmetry of the central portion for limiting roll deformation of the central portion, first and second connecting rods each extending from a respective first end to a respective second end, first and second main hinges, first and second secondary hinges, and a tertiary hinge, the first main hinge hinging the first gusset to the first connecting rod between the respective first end and the respective second end, the second main hinge hinging the second gusset to the second connecting rod between the respective first end and the respective second end, the first secondary hinge hinging the second end of the first connecting rod to a first point outside the central portion, the second secondary hinge hinging the second end of the second connecting rod to a second point outside the central portion, and the tertiary hinge hinging together the respective first ends of the first connecting rod and the second connecting rod.

13. A landing gear assembly for an aircraft, the landing gear comprising:
    a first skid extending in a longitudinal direction;
    a second skid extending in the longitudinal direction;

a cross-member having a first branch coupled to the first skid, a second branch coupled to the second skid, and a central portion coupled to the first branch and the second branch;

a limiter coupled to the central portion;

a connecting rod extending along a transverse direction, the transverse direction being generally perpendicular to the longitudinal direction;

a main hinge hingedly coupling the limiter to the connecting rod; and a secondary hinge configured to hingedly couple the connecting rod to a structural point outside the central portion.

14. The landing gear assembly of claim 13, wherein the limiter includes a gusset extending from a first end coupled to the central portion to a second end coupled to the main hinge.

15. The landing gear assembly of claim 13, wherein the central portion has a plane of symmetry defining a first side of the landing gear assembly and a second side of the landing gear assembly, and wherein the limiter extends into the first side and the second side.

16. The landing gear assembly of claim 13, wherein the structural point includes a flange coupled to an aircraft fuselage.

17. The landing gear assembly of claim 13, further comprising a second connecting rod, wherein the structural point outside the central portion includes the first branch, and wherein the second connecting rod is hingedly coupled to the limiter and hingedly coupled to the second branch.

18. The landing gear assembly of claim 13, further comprising a second connecting rod, a second main hinge, a second secondary hinge, and a tertiary hinge, wherein the central portion has a plane of symmetry defining a first side of the landing gear assembly and a second side of the landing gear assembly, the limiter includes a first gusset on the first side and a second gusset on a second side, the connecting rod and the second connecting rod each extend from a respective first end to a respective second end with a respective middle portion therebetween, the tertiary hinge hingedly couples the respective first ends, the main hinge hingedly couples the first gusset to the respective middle portion of the connecting rod, the second main hinge hingedly couples the second gusset to the respective middle portion of the second connecting rod, the secondary hinge is configured to hingedly couple the respective second end of the connecting rod to a structural point outside the central portion, and the second secondary hinge is configured to hingedly couple the respective second end of the second connecting rod to a second structural point outside the central portion.

19. The landing gear assembly of claim 18, wherein the connecting rod and second connecting rod are arranged symmetrically relative to the plane of symmetry and the first and second gussets are arranged symmetrically relative to the plane of symmetry.

* * * * *